United States Patent [19]

Lam

[11] Patent Number: 4,565,296
[45] Date of Patent: Jan. 21, 1986

[54] COOKING PANS
[75] Inventor: Yanta Lam, Kwun Tong, Hong Kong
[73] Assignee: Meyer Manufacturing Company Limited, Kowloon, Hong Kong
[21] Appl. No.: 634,347
[22] Filed: Jul. 25, 1984
[51] Int. Cl.⁴ .............................................. B65D 25/28
[52] U.S. Cl. ................. 220/94 R; 16/110 A; 16/114 A
[58] Field of Search .................. 220/94 R; 16/110 A, 16/110.5, 114 A

[56] References Cited

U.S. PATENT DOCUMENTS

| 286,627 | 10/1883 | Niedringhaus et al. | 220/94 R |
| 2,172,524 | 9/1939 | Stevens | 16/114 A X |
| 2,521,463 | 9/1950 | Kircher | 16/110 A |
| 3,648,887 | 3/1972 | Hartley | 220/94 R |
| 4,008,822 | 2/1977 | Carroll | 220/94 R |
| 4,032,032 | 6/1977 | Carroll et al. | 220/94 R |

FOREIGN PATENT DOCUMENTS 1068401  6/1954  France ............................. 16/110 A Primary Examiner—Steven M. Pollard
Attorney, Agent, or Firm—Townsend & Townsend

[57] ABSTRACT

It is difficult to join a stainless steel handle to an aluminium alloy bowl of a cooking pan in a permanent and secure way. Therefore, a hexagonal stud is adhered to the outside of the bowl and a stainless steel patch is fixed to that stud by providing a hexagonal hole through which the stud passes to prevent twisting of the patch relative the stud and the outer end of the stud is riveted over to hold the patch in permanent face to face contact with the outside of the bowl. Thereafter, the handle is spot welded to the patch.

8 Claims, 4 Drawing Figures

COOKING PANS

This invention relates to cooking pans and in particular those which have metal handles where the metal of the handle is of a dissimilar material to the metal of the bowl.

BACKGROUND TO THE INVENTION

There are always difficulties in joining, say, a stainless steel handle to, say, an aluminium bowl. Thus, one cannot simply make a satisfactory electrical resistance weld between the two. In this connection, one needs to bear in mind the fact that, in use, cooking pans often contain boiling water or hot oil and so it is of vital importance that the join between the handle and the bowl be very secure.

A strong join can be achieved using one or more rivets which pass completely through the wall of the bowl. The problem with that, however, is that the rivet head is left within the bowl and inevitably a crevice exists between the head of the rivet and the wall of the bowl which can act as a food trap and create cleaning problems.

Another technique which has been used is to join a stud to the outside wall of the bowl. If the stud is of similar material to the material of the pan, this join can be made very simply by electrical resistance welding. Thereafter, the handle can be joined to the stud by a screw. This technique unfortunately does not produce a particularly attractive looking result, is not economical, and the screw can easily become loose during use so that the handle becomes loose which can be dangerous.

It is therefore an object of the invention to provide a relatively simple and secure manner of joining the handle to a pan where the handle and pan are of dissimilar metals.

BRIEF SUMMARY OF THE INVENTION

According to the invention, there is provided a method of making a cooking pan with a handle, at least the inner end i.e. the end which is fixed to the bowl, of which is of metal, in which method an outwardly projecting stud is adhered to the outside wall of the shaped bowl, a patch of a material which can be readily welded to the metal material of the inner end of the handle and having a central hole which fits over the stud is placed over the stud with the stud projecting through the hole so that the patch is in wall to wall contact with the outside surface of the bowl, the hole and the stud having non-circular cross-sections such that the patch is mechanically located non-rotatably relative the stud, the stud is riveted over to secure that patch firmly against the outside wall of the pan, and thereafter, the metal material of the inner end of the handle is welded to the patch to secure the handle in place.

Such a procedure is relatively quick and simple to perform and relatively cheap. Also, a very secure join can be provided which will be long lasting. Further, since the join does not make use of screws or the like which can become loose during use, the join can be permanent.

The invention also extends to a pan which is being produced by this method. Such a cooking pan comprises a metal bowl, an outwardly projecting stud adhered to the bowl and having an outer end, a metal patch fixed in face to face contact with the bowl by having an opening through which the stud projects and riveting over the outer end of the stud, and the handle being joined to the patch by welding the inner end of the handle to the patch after fixing the patch to the bowl.

According to one preferred embodiment of the invention, the cooking pan has at least one handle whose inner end is of metal, and comprises a metal bowl of a first metal, a handle at least the inner end of which is of a second metal which is a material not readily weldable to said first metal, an outwardly projecting stud adhered to said metal bowl, said stud having a transverse cross-section which is non-circular and a longitudinal axis, a metal patch of a material readily weldable to said second metal, an opening through said patch of a shape and size to fit over said stud and be mechanically held non-rotatably relative said longitudinal axis of said stud, said patch being held in face to face contact with the bowl with the stud passing through said hole and the outer end of said stud riveted over to hold said patch in place in face to face contact with the bowl, and said handle being joined to said patch by welding.

The stud can, for example, have a hexagonal cross-section which cooperates with and fits tightly with a corresponding hexagonal opening in the patch. Other cross-sectional shapes such as oval or other polygonal shaped cross-sections are possible however. The fitting of a stud to the outer surface of a metal bowl is a well-known technique and can be accomplished, for example, by resistance welding or mechanical friction welding.

The handle can be a wholly metal handle, e.g. made by bending a thin sheet into a hollow tubular handle. Alternatively, the handle could be a composite handle made of wood or plastics with an inner end, i.e. the end to be attached to the bowl, of metal to act as a flame guard.

The handle can comprise an inner end having outwardly bent integral flanges, and the handle is then joined to the patch by welds made between the flanges and the patch. Alternatively the inner end of the handle can have a number of small spaced projections, e.g. four, which are then welded to the patch to join the handle to the patch.

The weld between the handle and the patch can be made electrically by spot welding, resistance welding or the like.

The invention is particularly applicable to the joining of a stainless steel handle to an aluminium alloy pan, the aluminium alloy pan having been optionally black-anodised before the handle is joined. Where the handle is stainless steel as in this example then the patch can also be of stainless steel whilst the stud can be of aluminium alloy so that it can be readily resistance welded to the material as well. Other metals are possible, however. These include copper and cast iron.

BRIEF DESCRIPTION OF THE DRAWINGS

The invention will now be described, by way of example, with reference to the accompanying drawings, in which.

DESCRIPTION OF THE DRAWINGS

Figure 1:
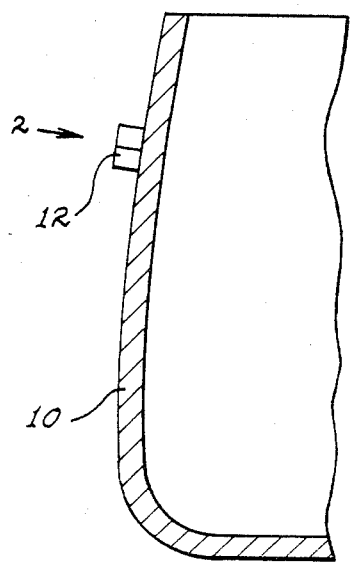
FIG. 1 is a sectional detail showing the first step in producing a cooking pan according to the invention.

Referring to the drawings, the bowl 10 of a pan is first shaped in conventional fashion from a metal such as aluminium alloy and finished again in conventional fashion such as by giving it a black-anodised surface. The shaping and furnishing of such an aluminium bowl is entirely conventional and well known and no further explanation is believed to be necessary. The bowl could, for example, be of 12 gauge thickness which is preferred but could be thinner, e.g. of 6 or 8 gauge in thickness.

Figure 2:
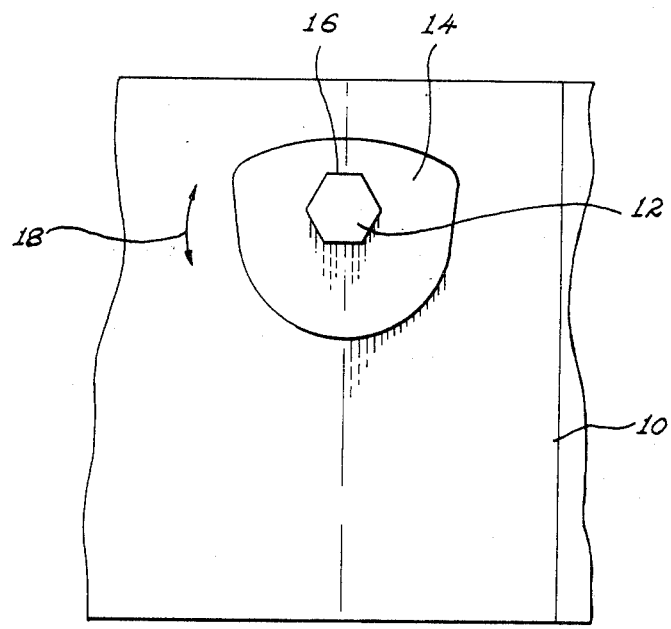
FIG. 2 is a detailed elevation in the direction of the arrow 2 of FIG. 1 showing the next step.

To the outside wall of the plain bowl 10 is adhered a metal stud 12. As best shown in FIG. 2, this stud has a transverse cross-section which is hexagonal. The stud is fixed in place by, for example, resistance welding. This is possible because it is also made of an aluminium alloy and so can readily be joined to the aluminium alloy metal of the bowl 10. The making of such resistance weld by joining a stud to the outside surface of a pan is again well known and not believed to require further explanation. In particular, it will be noted that the join can be permanent and strong and is made on the outside surface of the bowl 10 and so in no way does this affect the inside surface of the bowl 10 which can therefore remain entirely smooth and crevice free.

Once the stud has been fixed in place, a stainless steel metal patch 14 is fitted over the stud. This patch has a central opening 16 of hexagonal shape so that it fits tightly over the stud 12. As a result, the two are mechanically secured to one another against twisting of the patch relative the stud in the sense of the double-headed arrow shown in FIG. 2.

Figure 3:
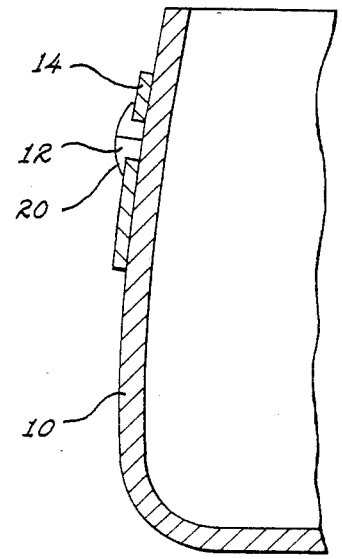
FIG. 3 is a sectional detail similar to FIG. 1 showing a further step.

The patch 14 is secured in place in face to face contact with the side wall of the bowl by riveting over the outer end of the stud, as best shown in FIG. 3, gives an enlarged flattened head 20. This mechanically and physically secures the patch in a permanent and rigid fashion onto the outside face of the bowl 10 so that there is no slackness or looseness.

Figure 4:
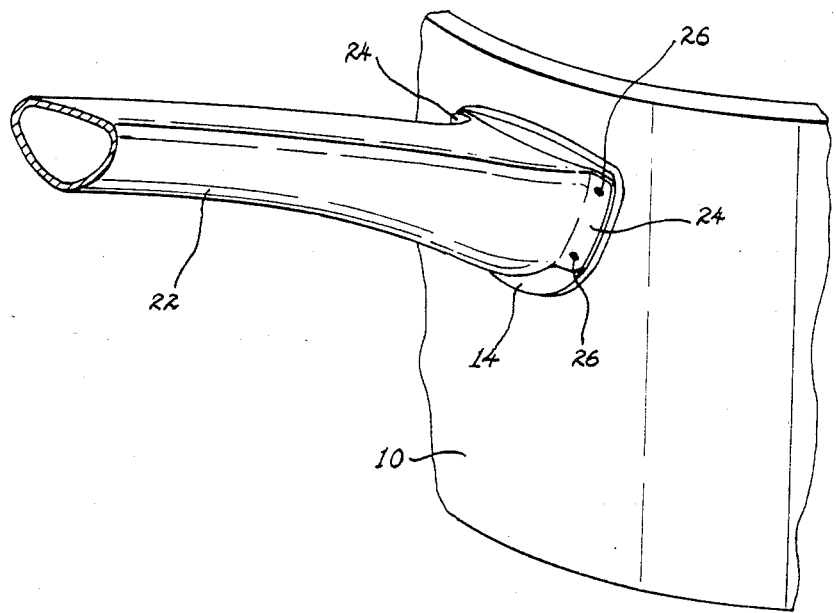
FIG. 4 is a perspective detail showing the finished attachment of the handle to the pan.

Having fixed that patch 14 in place, a handle 22 can now be welded to the patch to secure the handle to the bowl 10. As best shown in FIG. 4, the handle 22 has been made by folding a stainless steel sheeting and has at its inner end a pair of outwardly bent wings, flanges or lugs 24. These approximately reach to the side edges of the patch 14 and can be joined to the patch by electrical spot welds 26. The making of these welds is again a well-known technique and does not need further explanation. The welds are, however, very secure and permanent and so in this way the handle 22 can be permanently adhered to the bowl 10 despite the fact that the handle 22 is of stainless steel and the body of the bowl 10 is of an aluminium alloy so that one cannot readily be adhered to the other.

The method of the invention is simple and relatively cheap and in addition can be highly automated. Further, the fixing of the handle to the bowl can be permanent so that there is no substantial risk of separation of the handle when the bowl may be full of hot and dangerous liquid such as boiling water or hot oil.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. A cooking pan having at least one handle comprising a bowl of a first metal, a handle at least the inner end of which is of a second metal which is a material not readily weldable to said first metal, an outwardly projecting stud adhered to said metal bowl, said stud having a transverse cross section which is non-circular and a longitudinal axis, a metal patch of a material readily weldable to said second metal, an opening through said patch of a shape and size to fit over said stud and be mechanically held non-rotatably relative said longitudinal axis of said stud, said patch being held in face to face contact with the bowl with the stud passing through said hole and the outer end of said stud riveted over to hold said patch in place in face to face contact with the bowl, and said inner end of said handle being joined to said patch by welding.

2. A cooking pan according to claim 1 in which said inner end of said handle has outwardly bent integral flanges, and in which said handle is joined to said patch by welds made between said flanges and said patch.

3. A cooking pan according to claim 1 in which said bowl is made of aluminium alloy and said handle and said patch of stainless steel.

4. A cooking pan according to claim 1 in which said stud has a hexagonal cross-section and said opening in said patch is of corresponding hexagonal cross-section.

5. A method of making a cooking pan with a handle, at least the inner end of which is of metal, in which method an outwardly projecting stud is adhered to the outside wall of the shaped bowl, a patch of a material which can be readily welded to the material of said inner end of said handle and having a central hole which fits over the stud is placed over said stud with said stud projecting through said hole so that the patch is in wall to wall contact with the outside surface of said bowl, the hole and the stud having non-circular cross-sections such that said patch is mechanically located non-rotatably relative said stud, said stud is riveted over to secure said patch firmly against the outside wall of said bowl, and thereafter, said inner end of said handle is welded to the patch to secure said handle in place.

6. A method according to claim 5 in which said inner end of said handle has outwardly bent integral flanges, and in which said handle is joined to said patch by welds made between said flanges and said patch.

7. A method according to claim 5 in which said bowl is made of aluminium alloy and said handle and said patch of stainless steel.

8. A method according to claim 5 in which said stud has a hexagonal cross-section and said opening in said patch is of corresponding hexagonal cross-section.

* * * * *